United States Patent
Humble (12)

(10) Patent No.: US 6,529,940 B1
(45) Date of Patent: Mar. 4, 2003

(54) METHOD AND SYSTEM FOR IN-STORE MARKETING

(76) Inventor: David R. Humble, 3467 W. Hillsboro Blvd., Suite 2, Deerfield Beach, FL (US) 33442-9421

(*) Notice: Subject to any disclaimer, the term of this patent is extended or adjusted under 35 U.S.C. 154(b) by 0 days.

(21) Appl. No.: 09/321,770

(22) Filed: May 27, 1999

Related U.S. Application Data (60) Provisional application No. 60/087,028, filed on May 28, 1998.

(51) Int. Cl.[7] .............................................. G06F 15/16
(52) U.S. Cl. ...................................... 709/204; 709/217
(58) Field of Search ................................ 709/217, 200, 709/204

(56) References Cited

U.S. PATENT DOCUMENTS

| | | |
|---|---|---|
| 4,750,151 A | 6/1988 | Baus |
| 5,105,184 A | 4/1992 | Priani et al. |
| 5,347,632 A | 9/1994 | Filepp et al. |
| 5,557,658 A | 9/1996 | Gregorek et al. ............. 379/67 |
| 5,812,647 A | 9/1998 | Beaumont et al. .......... 379/111 |
| 5,845,261 A | 12/1998 | McAbian |
| 5,850,433 A | 12/1998 | Rondeau ..................... 379/201 |
| 5,873,068 A | 2/1999 | Beaumont et al. ............ 705/14 |
| 5,918,211 A | 6/1999 | Sloane |
| 5,995,942 A | * 11/1999 | Smith et al. |

FOREIGN PATENT DOCUMENTS

| | | |
|---|---|---|
| WO | WO 97/14118 | 4/1997 |
| WO | WO 98/30008 | 7/1998 |

OTHER PUBLICATIONS

Townsend et al., Microsoft Office 6–in–1, Que Corporation, 1994, pp. 509–603.*

Hansson, Allan et al., *Phone Doubler—A Step Towards Integrated Internet and Telephone Communities*, Ericsson Review, No. 4, 1997, pps. 142–152.

* cited by examiner

Primary Examiner—John A. Follansbee
Assistant Examiner—J E Avellino
(74) Attorney, Agent, or Firm—Cohen, Pontani, Lieberman & Pavane (57) ABSTRACT

A destination server (18) associated with a system (10) for in-store marketing receives (130) messages from developers (12) over a distribution network (16). The destination server causes the messages to be displayed (134) by one or more interactive display terminals (22). Individuals can input (136) various feedback information into the terminals which indicate the individual's response to the displayed message. This feedback information is sent (152) to the developer's computer system (12), enabling the developer to evaluate the feedback information and, if desired, modify and re-distribute the message. Prior to distribution, the developer can select (104) multiple destination servers (18) to which the developer wants the message to be distributed, and can also select (110) multiple time slots during which the message will be displayed by interactive display terminals (22).

19 Claims, 5 Drawing Sheets

METHOD AND SYSTEM FOR IN-STORE MARKETING

CROSS-REFERENCE TO RELATED APPLICATION

This application claims the benefit of U.S. Provisional Application No. 60/087,028, filed May 28, 1998, and entitled "METHOD AND SYSTEM FOR IN-STORE MEDIA ADVERTISING AND PROMOTION."

BACKGROUND OF THE INVENTION

This invention relates generally to in-store marketing, and in particular, to a comprehensive method and system for creating, distributing, and managing in-store marketing campaigns, and the interactive communications between consumers, retailers, and manufacturers.

In-store marketing is used every day by consumer goods companies to reach millions of consumers in retail stores. The industry uses conventional print materials and manual distribution, which typically require long lead times to implement marketing campaigns. Examples of in-store marketing are display signs, coupon dispensers, promotion kiosks, printed materials, video displays, electronic displays, and product advertising in various other formats.

Prior-art, in-store marketing techniques generally include a number of steps to create, distribute, and monitor the results of a marketing campaign or message. Typically, a manufacturer or retailer creates a marketing offer, and employs the services of an in-store marketing company to act an intermediary. The marketing company then formats the marketing offer to its particular network specifications, and delivers the formatted offer to various stores. If the marketing offer is in print, then individuals at the stores install or display the printed offer at one or more locations in the store. This process is inefficient, and it may take days or weeks to get a marketing message from a conceptual stage to an actual in-store display.

Conventional in-store marketing techniques come in many forms, but at least four common characteristics of prior-art marketing methods exist that cause these methods to be costly and time-consuming. These characteristics are that: 1) marketing messages from a manufacturer or retailer must be printed or formatted to the specifications of the in-store marketing companies that place the marketing messages into stores; 2) marketing messages are placed in a store for a fixed period of time, and typically are not changed until the next marketing cycle; 3) no convenient way exists for a manufacturer or retailer to measure the effectiveness of a marketing message until the marketing cycle is completed, and the in-store marketing company reports the results to the manufacturer or retailer; and 4) no convenient way exists for a consumer at the point-of-sale (e.g., while in a store) to interact with the manufacturer or retailer in real time.

What are needed are a method and system for manufacturers and retailers to rapidly deploy marketing messages to stores where their products are sold. What are further needed are a method and system that enable a manufacturer or retailer to change marketing messages at any time or times during a marketing cycle. What are further needed are a method and system for a manufacturer or retailer to rapidly measure the effectiveness of a marketing message, so that the marketing message can be further deployed or modified to maximize the message's potential. What are further needed are a method and system that enable a consumer at the point-of-sale to interact, in real time, with a manufacturer or retailer, so that the consumer can order products, ask questions, provide comments, or otherwise communicate with a manufacturer or retailer.

SUMMARY OF THE INVENTION

After a developer creates a message for distribution, a system for distributing messages to multiple destinations interacts with the developer to determine one or more destinations to which the message should be distributed. The system then distributes the message to the destinations, and receives feedback information from the destinations which indicates human reactions to the message after the message is displayed.

The system for displaying the messages includes one or more destination servers that receive the message over a network and send the message to at least one interactive display terminal. The interactive display terminal displays the message, receives one or more user inputs responsive to the message, and sends feedback information to the destination server, where the feedback information reflects the one or more user inputs. The destination server sends the feedback information to the originator of the message.

The interactive display terminal includes: a network interface that enables the interactive display terminal to communicate with a destination server; a processor that causes the message to be displayed via a user interface and that interprets user inputs responsive to the message; and the user interface that displays the message and receives the user inputs responsive to the message.

DETAILED DESCRIPTION OF THE PREFERRED EMBODIMENTS

As used herein, the term "developer" refers to any individual or entity that creates a message for distribution in accordance with the present invention. A developer could be, for example, a marketing representative of a manufacturer or retailer who creates a marketing message for distribution, although the method and application of the present invention could be applied in many other contexts as well. The term "manufacturer" is used herein for exemplary purposes. It is meant to refer to any entity or individual associated with the creation of the distributed message, where that message could be a marketing message or any other type of distributed message. The term "distributor" as used herein refers to the server/network that is used to distribute the developed message to various destinations, where, the term "destination" as used herein refers to any server/display system that is the destination of the developed message. A destination could be, for example, a server and set of interactive display terminals that are located in a retail store, although the method and apparatus of the present invention could be applied in many other contexts as well.

In a preferred embodiment, the method begins when a developer creates a message on a personal computer using an existing or custom software application. Then, via a network such as the Internet, the developer communicates with the distribution server to identify destinations where the developer would like the message to be distributed. The developer is prompted to select from available "time slots" during which the selected destinations can display the message. Via the distribution server, the message is then sent over a distribution network (e.g., the Internet) to the selected destination servers. During the selected time slots, the destination servers then send all or part of the message to various interactive display terminals which display the message.

In a retail sales context, where the interactive display terminal displays marketing messages from a manufacturer, consumers can use the interactive display terminals to request and obtain more product information, to print the message or other information, or to place orders in a convenient way. Each of these consumer actions is considered a consumer input or response, which could indicate consumer interest in the products and, thus, the effectiveness of the marketing message. In a preferred embodiment, the destination server also collects sales information from the store's point-of-sale (POS) system, which keeps track of consumer purchases. The destination server compiles the POS information along with the consumer responses, and reports this feedback information to the manufacturer who sponsored the marketing message. The manufacturer can then immediately measure the results of the marketing message and make changes, if desired, in less time and at less cost than prior-art, in-store marketing techniques, which rely on distribution or print advertising and the services of an intermediary in-store marketing company.

In a preferred embodiment, the interactive display terminal displays the message via a touch-sensitive screen, and consumers can touch-thru to reach other information or display pages. In alternate embodiments, the terminal can display the message in other ways (e.g., by printing the message), and can receive consumer input through a keyboard, mouse, trackball, microphone, or other means. In a preferred embodiment of the method and system, a manufacturer's representative can communicate directly with a consumer on the sales floor through the interactive display terminal (e.g., via a video conference or e-mail), and answer specific questions about a product.

The method and system are described in detail in conjunction with FIGS. 1–4. Although the term "manufacturer" is used to identify the origin of a particular marketing message, messages distributed in accordance with the disclosed system could also originate from other sources, or could include information other than marketing information. In addition, although the description indicates that messages are distributed to "stores," the messages could be distributed to destination servers that are not associated with retail sales in particular stores, or that are not associated with retail sales at all. In addition, although the description refers to "consumers," the method and system could be applicable to interaction with other types of end users.

The preferred embodiment described below is intended to illustrate one particularly advantageous application of the method and apparatus of the present invention. It is not intended to limit application of the method and apparatus of the present invention to marketing applications in the retail context. In various other applications, the method and system of the present invention could be located in virtually any other type of business or personal context that could benefit from the information distribution and feedback advantages of the method and apparatus of the present invention.

Figure 1:
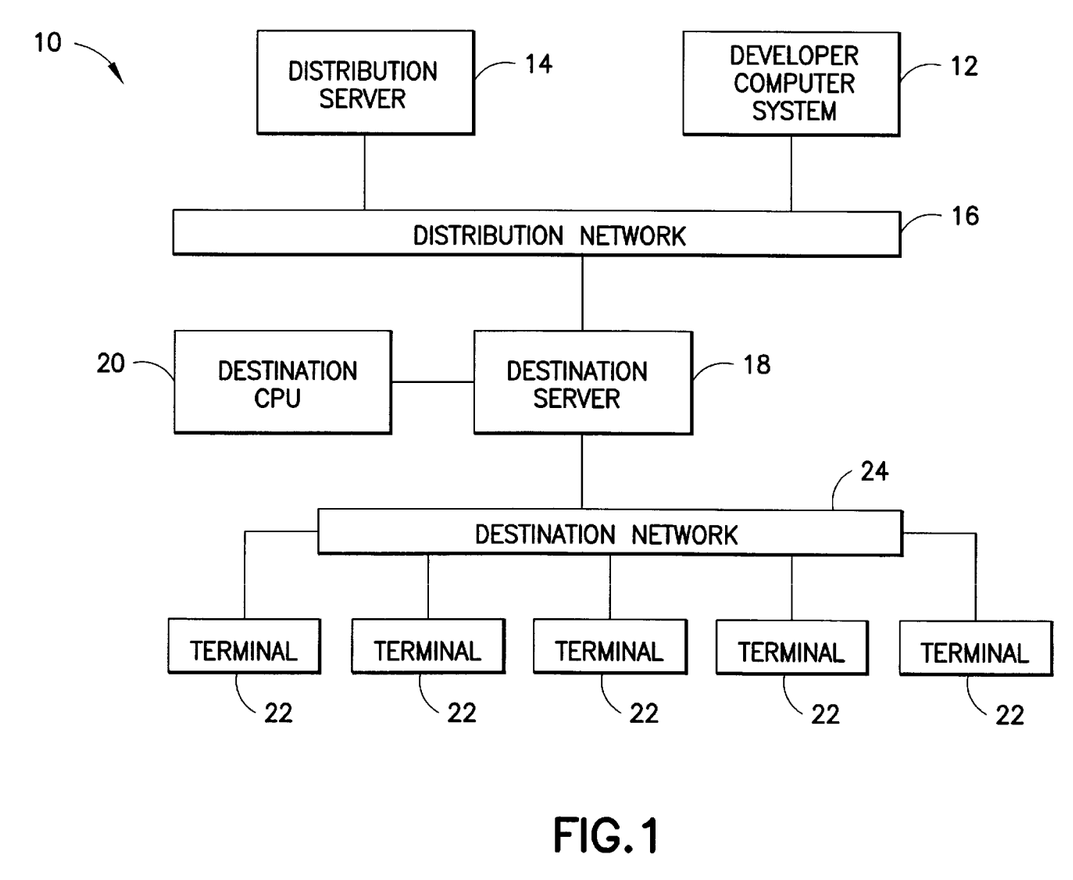
FIG. 1 illustrates a simplified block diagram of a marketing system in accordance with a preferred embodiment.

FIG. 1 illustrates a simplified block diagram of a marketing system 10 in accordance with a preferred embodiment. In a preferred embodiment, marketing system 10 includes developer computer system 12, distribution server 14, distribution network 16, destination server 18, destination central processing unit (CPU) 20, interactive display terminals 22, and destination network 24.

In an exemplary embodiment, developer computer system 12 is associated with a manufacturer and includes one or more client computers that are used by a manufacturer's marketing representatives (or developers) to create and develop marketing messages. A marketing message may include one or many levels of information (e.g., pages), and can be created using existing or custom software applications. The marketing representative interacts with software at the distribution server 14 in order to select destinations and times where and when the marketing message will be distributed. In a preferred embodiment, this interaction takes place over distribution network 16, although the interaction could alternatively take place over another network or direct link that is distinct from distribution network 16.

Network 16 could be, for example, the Internet, a local area network (LAN), a wide area network (WAN), or some other type of network or direct link. The distribution server 14 controls distribution of the marketing message over distribution network 16 to the selected destination servers 18 at or before the selected time or times. In a preferred embodiment, the marketing message is distributed over the Internet, although it could be distributed over a LAN, WAN, other network, or direct link.

After receiving the marketing message, destination server 18 then distributes all or part of the marketing message to the appropriate interactive display terminals 22 at the selected time or times. In a preferred embodiment, the destination server 18 distributes the message via a destination network 24 that is a LAN, although some other distribution method also could be used. In one embodiment, destination server 18 serves a single store. In other embodiments, a single destination server could supply multiple stores or a set of geographically-distant interactive display terminals. In another embodiment, multiple destination servers could supply a single store. Destination server 18 could be located in close proximity to the interactive display terminals it services (e.g., located in the store), or could be remotely located.

Interactive display terminals 22 include a processor and any of a combination of user-interface devices such as a touch-sensitive screen, monitor, keyboard, mouse, speaker, microphone, printer, and/or magnetic card reader. Each of these user-interface devices provide the ability to display information and/or receive consumer input responsive to the displayed marketing message. For example, a consumer could use the touch-sensitive screen to access further information about products and services, to give comments, or to place orders. This further information could be stored at the interactive display terminal 22 or at the destination server 18 Alternatively, the further information may need to be obtained directly from the manufacturer via the destination server 18, distribution network 16, and developer computer system 12. Preferably, a substantial amount of information expected to be requested by consumers would be located at the interactive display terminal 22 or the destination server 18, rather than at the developer computer system 12. In this way, the consumer has instant access to the information, without ever having to wait through distribution network 16 transmission delays.

In a preferred embodiment, the destination server is also connected to destination CPU 20, which manages the store's POS system. In an alternate embodiment, the store's POS system could be managed by destination server 18, rather than CPU 20. Among other things, the store's POS system keeps track of consumer purchases, which could be valuable information to manufacturers and retailers in assessing the effectiveness of a marketing message. Typical POS systems are linked to a number of cash registers via a local network. In prior-art systems, various entities could directly access the destination CPU to access the store's POS information. In accordance with a preferred embodiment, the destination CPU could be accessed via destination server 18 as well.

Although FIG. 1 illustrates only one each of developer computer system 12, distribution server 14, distribution network 16, destination server 18, destination CPU 20, and destination network 24, system 10 could include much larger numbers of each of these devices or networks. In addition, where FIG. 1 illustrates four interactive display terminals 22, more or fewer interactive display terminals could be managed by a particular destination server 18.

Figure 2:
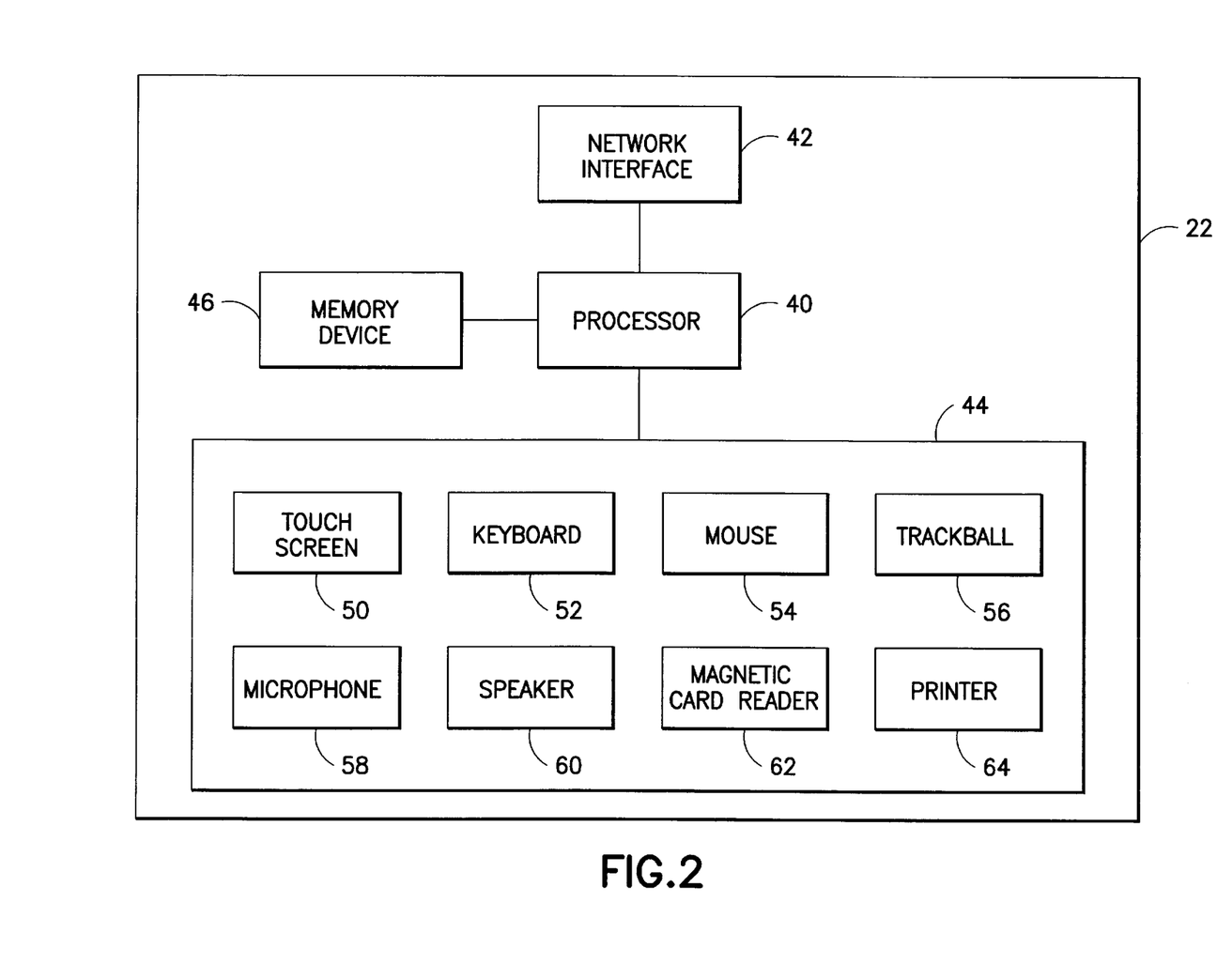
FIG. 2 illustrates a simplified block diagram of an interactive display terminal in accordance with a preferred embodiment.

FIG. 2 illustrates a simplified block diagram of an interactive display terminal 22 in accordance with a preferred embodiment. Interactive display terminal 22 includes a processor 40, network interface 42, user interface 44, and memory device 46. User interface 44 could include any of a combination of a touch-screen 50 or monitor, keyboard 52, mouse 54, trackball 56, microphone 58, speaker 60, magnetic card reader 62, and printer 64.

Via network interface 42, interactive display terminal 22 receives marketing messages and sends feedback information to a destination server. Upon receiving a marketing message, processor 40 causes the marketing message to be displayed via user interface 44 and/or stored via memory device 46.

Various types of interactive display terminals having different user interfaces could exist. For example, one type of interactive display terminal may include only touch-screen 50 as a user interface. The marketing message would be visually displayed on touch-sensitive screen 50, and the consumer would give feedback to the system by touching various areas of touch-screen 50. Alternatively, the interactive display terminal could include a monitor that is not a touch-sensitive screen. The interactive display terminal also could include a keyboard 52 with which the consumer could input text, a mouse 54 or trackball 56 with which the consumer could select certain areas of the displayed message, and/or a speaker 60 which could output audio portions of the marketing message. Printer 64 could be used to print the displayed message or other information.

In addition, the user interface could include a microphone 58, which would receive voice commands or other information from the consumer. Using speech recognition software, processor 40 could convert those voice commands into feedback information and act accordingly.

The user interface also could include a magnetic card reader 62, which is used to read information from a magnetic card that is carried by the consumer or some other individual. A consumer's magnetic card could, for example, be a card that identifies the consumer as being a member of a club or organization (e.g., a member of a "club" grocery store). Alternatively, the card could include information (e.g., a user ID and password) that the system needs to grant access to particular information to the consumer. The magnetic card reader 62 also could be used to receive credit card information, so that a consumer could order and pay for a particular item using his or her credit card.

Figure 3:
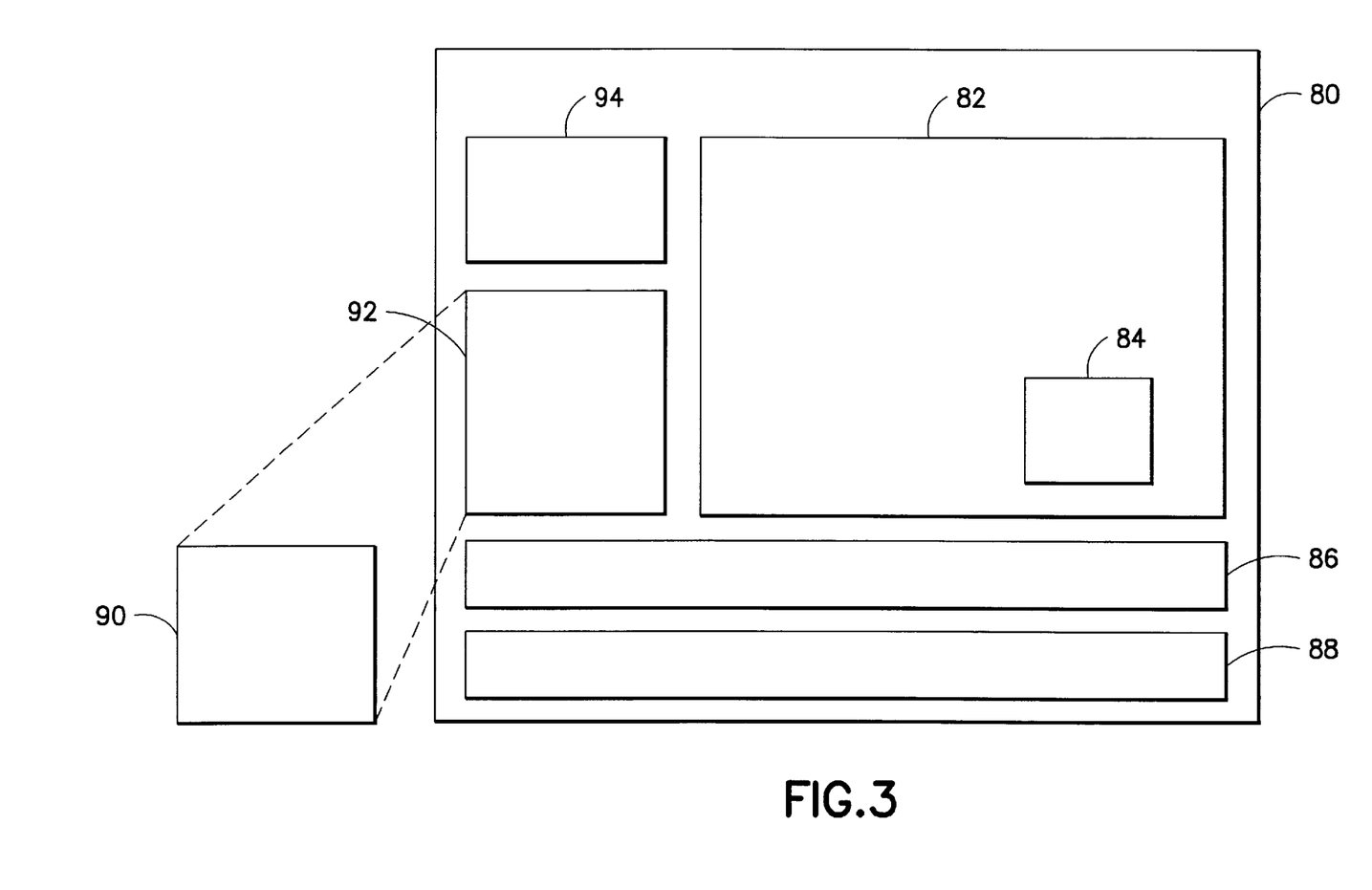
FIG. 3 is an example of a display provided by a touch-sensitive screen of an interactive display terminal in accordance with a preferred embodiment.

FIG. 3 is an example of a display screen 80 provided on a touch-screen monitor of an interactive display terminal in accordance with a preferred embodiment. In a preferred embodiment, a plurality of sections exist within each display screen. These sections could include, for example, a marketing message 82 from a manufacturer and a touch-sensitive section 84 which is used by consumers for requesting or inputting information. For example, the marketing message 82 could include an advertisement for a particular product or service. The marketing message 82 could be a static graphical display, or it could include animated graphics. In addition, the marketing message 82 could step through various different screens, either with or without consumer interaction. Touch-sensitive section 84 could display a message that indicates, to a consumer, that by touching section 84, the consumer can get additional information regarding the advertised product or service. For example, section 84, when touched, could provide the consumer with price information, an ingredient list, statistical information, or any other type of information.

In addition, in various embodiments, the display screen could include sections such as: a section 86 for displaying general information that may be unrelated to the marketing message (e.g., local weather and headline news); a section 88 that enables consumers to access information content in other categories (e.g., health, life or finance); a touch-sensitive section 92 that brings up a new display screen 90 with detailed information about the same or another product or service depicted in section 92; and/or a touch-sensitive section 94 that enables a consumer to access store services (e.g., a product locator). Some of these sections (e.g., local weather and headline news) could be linked, via the destination server, to particular Internet sites which provide the various types of information.

The visual information that can be provided by a display screen such as screen 80 can be in the form of static text or images, or it can include one or more sections that display animated advertisements, moving banners, or other dynamic images. In addition, interactive display terminal can include a speaker for providing audio marketing or other information that, desirably, is relevant to the marketing message being displayed. In various embodiments, the marketing message could be in the form of an electronic document that is suitable for printing, an audio file, or a combination of various types of audio-visual and textual information.

As explained previously, in order to receive consumer input, interactive display terminal could also or alternatively include a keyboard, mouse, and/or trackball with which the consumer can type queries or comments, or click on various sections of the display screen. These input devices could be used for receiving consumer feedback instead of or in addition to the touch-screen technology. An interactive display terminal also could include a microphone that, coupled with speech recognition software, could be used to receive consumer queries, commands or comments.

Figure 4:
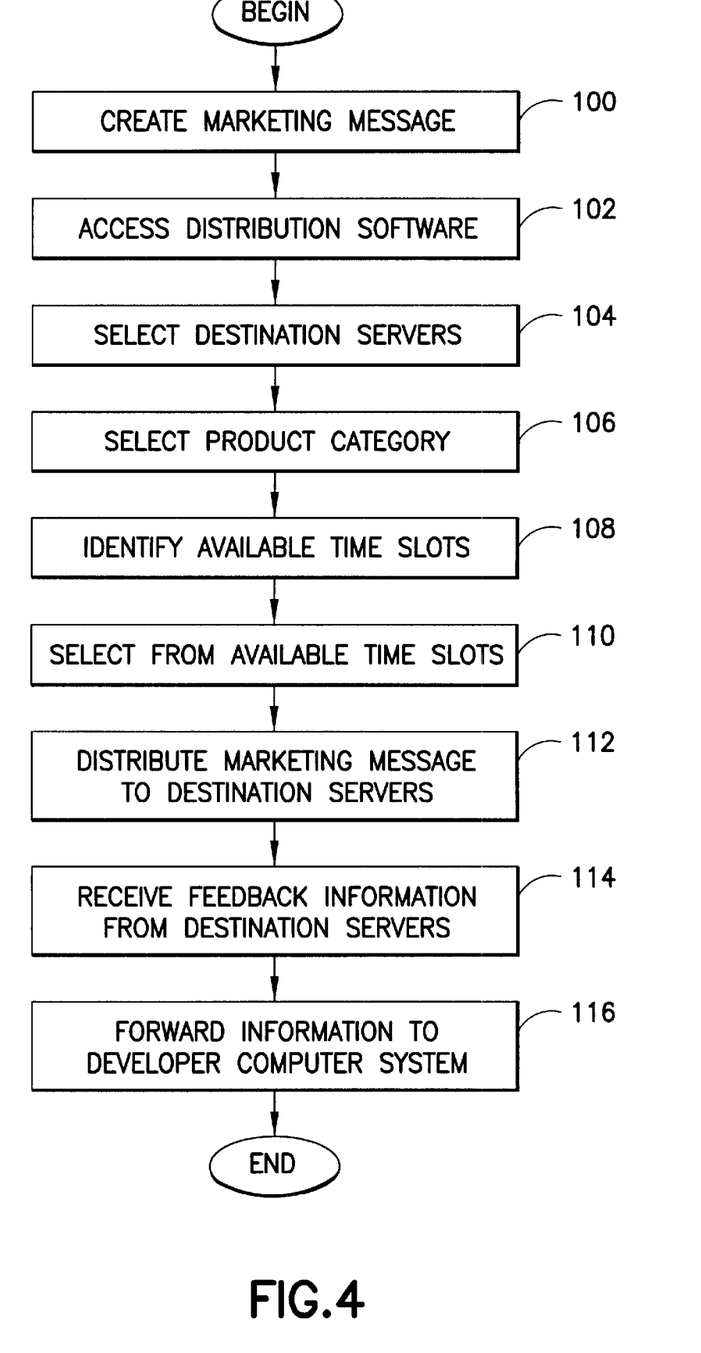
FIG. 4 illustrates a flowchart of a method for creating and distributing a marketing message in accordance with a preferred embodiment.
Figure 5:
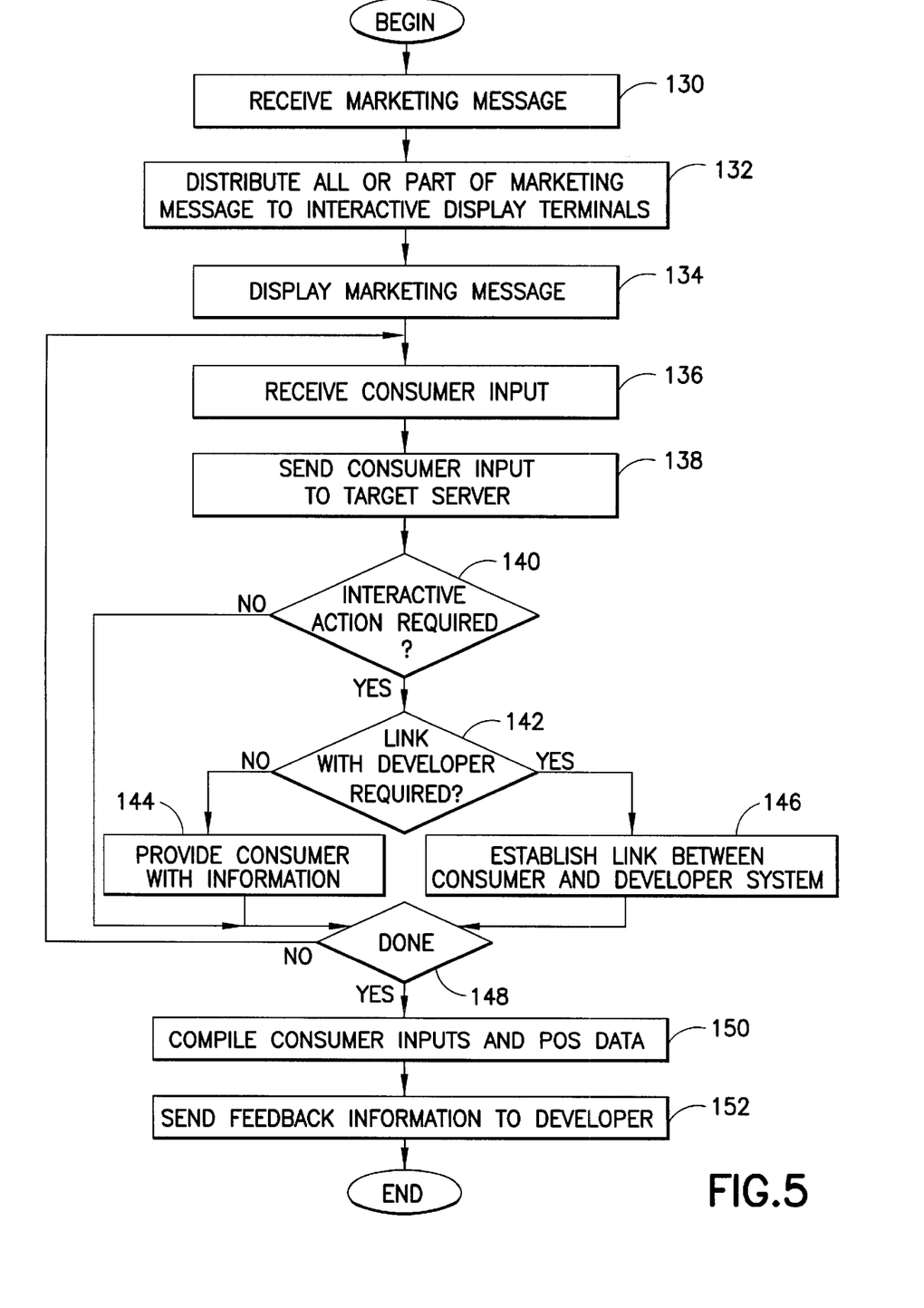
FIG. 5 illustrates a flowchart of a method for displaying a marketing message and responding to consumer inputs in accordance with a preferred embodiment.

FIGS. 4 and 5 illustrate the method of the present invention. In particular, FIG. 4 illustrates the method from the perspective of the developer computer system and the distribution server, and FIG. 5 illustrates the method from the perspective of the destination server and the interactive display terminals.

FIG. 4 illustrates a flowchart of a method for creating and distributing a marketing message in accordance with a preferred embodiment. The method begins, in step 100, when a developer (e.g., a marketing representative of a manufacturer) creates a message (e.g., a marketing message) on a computer which, for the purposes of this description, is a client computer.

After creation of the marketing message, the developer accesses distribution software, in step 102. In a preferred embodiment, the distribution software is located on a distribution server that can be accessed by the developer's client computer over the Internet or some other network (e.g., a LAN or WAN). In an alternate embodiment, the distribution software could be resident on the developer's computer or on a storage device otherwise accessible to the computer.

The distribution software enables the developer, in step 104, to select destination servers to which the developer would like the marketing message to be sent. As described previously, the destination servers are typically located at or in proximity to a store or other marketing destination point, and are connected to one or more interactive display terminals via a destination network.

In a preferred embodiment, destination server selection is facilitated by the distribution software. For example, the distribution software could provide the developer with a list of destination servers based on developer-provided information such as: geographic areas of interest; store categories; store names; and/or product categories.

The distribution software also enables the developer, in step 106, to select one or more product categories that pertain to the marketing message. A product category would indicate the types of products or services that a marketing message is promoting. For example, product categories may include categories such as laundry detergents, trucks, or cleaning services, to name a few. Again, the distribution software could facilitate product category selection by providing a list of common product categories.

The product category information is useful for the distribution system or the destination servers to determine on which interactive display terminals the marketing message would be most effective. For example, a particular destination server may include interactive display terminals throughout a large department store. If a marketing message is related to laundry detergent, then the distribution system or destination server could determine that the message would best be displayed by an interactive display terminal located in proximity to the cleanser section or the clothes washer section. It may not be desirable to display the message on an interactive display terminal located in proximity to the automotive or electronics sections.

In other applications where the message pertains to other than retail sales, the category selection in step 106 could be the selection of one or more categories relevant to the application. For example, the categories could pertain to types of audiences to which the message should be directed. Types of audiences could include, for example, children, doctors, or women. Numerous different types of category selections could be relevant to various applications that use the method and apparatus of the present invention.

In step 108, the distribution software identifies available time slots at which the marketing message could be displayed by interactive display terminals connected to each of the identified destination servers. In a preferred embodiment, the distribution server maintains a database that indicates, for each particular product category relevant to a particular destination server, which time slots are available (or unavailable) for displaying messages by the destination server's associated interactive display terminals. In an alternate embodiment, the distribution server could query each identified destination server for information relevant to available time slots for the identified product categories, and pass that information on to the developer.

In a preferred embodiment, the developer is presented not only with a list of available time slots, but also with the destination servers associated with those time slots, and how many interactive display terminals are available during each time slot. Upon being presented with available time slots, the developer is prompted, in step 110, to select the available time slots during which the developer wants the marketing message displayed. The developer also can specify the number of interactive display terminals upon which the developer wants the marketing message displayed during each time slot.

In a preferred embodiment, the developer is charged a fee based on the number of times the marketing message is distributed and/or displayed, and also based on the time of day of the selected time slots. For example, the developer may be charged more for having the marketing message displayed during prime shopping hours than the developer would be charged during off-peak hours. In addition, the developer may be charged more for having the message displayed at a popular retail store than the developer would be charged for display at a less-frequented establishment.

After selection of time slots, the distribution server distributes the marketing message, in step 112, to the various identified destination servers at a time or times prior to the available time slots for those servers. In a preferred embodiment, various information is sent to the destination servers along with the marketing message. For example, the distribution server could send a destination server the time slot information and the product category information. The time slot information would be useful to a destination server to ensure that the server sends the marketing message to the interactive display terminals at or near the selected time slot or time slots. The product category information is useful for the destination server to identify to which interactive display terminals the marketing message should be sent.

After a while, the distribution server receives, in step 114, feedback information from the destination servers which indicates the effectiveness of the marketing message. In a preferred embodiment, this information describes inputs from the consumer to the various interactive display terminals, and in a retail application, also POS information from the store's sales tracking system. Each destination computer may send the distribution server the feedback information at a different time. Thus, the distribution server may receive multiple sets of feedback information. In an alternate embodiment, the destination servers could send the feedback information directly to the developer computer system.

Upon receipt of the feedback information from destination servers, the distribution server then forwards the information, in step 116, to the developer's computer system and the method ends. Because the distribution server may receive multiple feedback information messages, the distribution server may send several feedback information messages to the developer's computer system. Alternatively, the distribution server may consolidate feedback information received from multiple destination servers before forwarding the information to the developer's computer system. In an alternate embodiment, the destination servers could send the feedback information directly to the developer's computer system, rather than sending the information through the distribution server. Using the feedback information, the developer can determine the effectiveness of the particular marketing message. The developer can then modify the marketing message or create a new marketing message, if desired, and begin the process again.

FIG. 5 illustrates a flowchart of a method for displaying a marketing message and responding to consumer inputs in accordance with a preferred embodiment. The method begins, in step 130, when a destination server receives a message (e.g., a marketing message) over a network. As described previously, the marketing message is sent by a distribution server, and could include one or several layers of information (e.g., pages). In an alternate embodiment, the marketing message could be sent directly from a developer computer system to the destination server.

In step 132, the destination server distributes all or part of the marketing message to all or a subset of the interactive display terminals connected to the destination server via the destination network. Preferably, the destination server would send the marketing message to those interactive display terminals that are located in proximity to products to which the marketing message pertains.

In step 134, the interactive display terminals display the marketing message. The message could be displayed in a static format or, as described previously, could have one or more sections that include animated or dynamic graphics or text. Where the marketing message includes more than one display screen, the interactive display terminals could switch from screen to screen with or without consumer interaction.

A consumer can interact with the interactive display terminal using one or more of the user interfaces previously described. For example, if the display screen includes touch-sensitive sections, the consumer could touch various areas of the screen to cause the interactive display terminal to take further actions.

In a preferred embodiment, after the interactive display terminal receives consumer input in step 136, the terminal sends the consumer input to the destination server in step 138. This assumes that the action the consumer has requested (e.g., a request for more information) cannot be handled by the interactive display terminal. If the interactive display terminal can handle the action (e.g., display a price that is stored at the interactive display terminal), then it may not be necessary to send the input to the destination server, although this input information may be sent for the purpose of providing the consumer input to the developer system.

Once the input has been received by the destination server, the server determines, in step 140, whether some interactive action is required. For example, the consumer may have requested additional information that is stored at the destination server. In such a case, the destination server would interact with the consumer by providing the information to the interactive display terminal at which the consumer is located. If no interactive action is required, the method proceeds to step 148, which is described below.

If interactive action is required, the method proceeds to step 142. In some cases, the destination server may not have sufficient information or capabilities to respond to the consumer input. A determination is thus made, in step 144, whether a network link with a developer computer system (e.g., a manufacturer) is required to respond to the consumer input. For example, the consumer may want some detailed information regarding the nutritional information of a particular product, and the developer may not have distributed this information to the destination server. In such case, it would be advantageous to enable the consumer input to be sent to the developer computer system so that it could respond accordingly.

If a link with a developer system is not required, then the destination server provides the consumer with the information, in step 144, by sending the information to the interactive display terminal. If a link with a developer is required, then the destination server establishes a link with the developer computer system, in step 146, and sends the consumer query. Upon receiving the information, the destination server then sends the information to the interactive display terminal. In an alternate embodiment, the destination server could send and receive the information via the distribution server or some other server.

A determination is then made, in step 148, whether the consumer is done interacting with the display screen. This determination could be made, for example, by the consumer pressing a "DONE" icon on the display screen, or otherwise affirmatively indicating that the consumer is finished. The determination also could be made if the consumer has not made any inputs at the interactive display terminal for a certain period of time (e.g., two minutes).

If the consumer is not done, then the procedure iterates as shown. If the consumer is done, then the destination server compiles the consumer inputs in step 150. The consumer inputs could be compiled on a consumer-by-consumer basis, or could be compiled as a batch, where inputs from multiple consumers interacting with one or more interactive display terminals could be compiled together at periodic or aperiodic time increments. In a preferred embodiment, POS data is also compiled, where the POS data indicates what products consumers actually purchased at the store. In an alternate embodiment, the POS data may not be included with the compiled information.

In step 152, the compiled consumer inputs and POS data, collectively referred to as feedback information, are sent to the developer (e.g., the manufacturer) who initiated the marketing message, and the procedure ends. The compiled consumer inputs and POS data could be sent directly to the developer, or could be sent via the distribution or other server. The developer could then review the consumer input and/or POS data to determine whether the developer considers the marketing message to be effective. If the developer decides that the marketing message is not sufficiently effective, the developer could then alter or replace the message. In an alternate embodiment, rather than the destination server periodically or aperiodically sending the feedback information to the developer, the destination server could compile and send the information in response to a query from the developer computer system.

The method and system provides a means for manufacturers and retailers to bypass long lead-time, conventional in-store marketing, and communicate directly with consumers faster and at less cost than conventional in-store marketing. In-store marketing is a time-sensitive process, and its efficiency is critical to consumer goods companies. Quick delivery and response time allows manufacturers and retailers to refine marketing promotions to achieve optimum results and respond to competition. The method and system of the preferred embodiment reduces in-store marketing delivery lead-time from weeks to hours, and reduces marketing costs by eliminating economies of scale factors. As an example, in accordance with the inventive arrangements, the cost to deliver a promotion to a very small or extremely large number of stores is nearly the same.

In addition, most people have experienced the frustration in attempting to find a sales person to answer a question relating to a particular product. Even after a consumer gets the attention of the sales person, the sales person may not have adequate knowledge of the product to answer all the consumer's questions. With the method and system of the preferred embodiment, manufacturers and retailers can make available a rich base of product information to consumers that is generally not available from semi-trained store personnel. A consumer at an interactive display terminal can access all product information the retailer or manufacturer cares to make available, and since the information originates from the retailer or manufacturers headquarters, the information can be easily updated and delivered to the store via the method and system of the present invention. This advantageous aspect of the method and system allows consumers to access the latest manufacturer information, at their convenience, and while they are in front of the product. In addition, it enables the consumer to order a product that is out of stock or otherwise not available in the store.

Retailers and manufacturers can advantageously use the method and system to reach specific types of consumers, to promote and sell products, and to educate or instruct consumers. Through the use of database capabilities, or identification cards (e.g., magnetic cards carried by the consumer), individual consumers can be identified, and manufacturers can deliver appropriate marketing offers in a much more cost effective manner. In addition, the system can be configured by retailers to: deliver loyalty programs; take orders for out-of-stock products; print instructions; deliver special rewards to the consumers; or add proprietary and/or marketing value to the retailer to differentiate themselves in the marketplace. Manufacturers can present their product consistently across the market, measure different marketing messages or prices rapidly, and offer a full line of products for sale with only samples on the sales floor.

The method and system is an alternative to conventional in-store marketing, advantageously featuring speed, rapid sales results, delivery, and animated displays as points of product differentiation.

The in-store marketing system and method, according to the inventive arrangements taught herein, overcome all of the serious obstacles present with prior-art in-store marketing techniques, and provide an alternative to conventional in-store marketing with many advantages. In a preferred embodiment, the system and method of the present invention use Internet technology to bypass current in-store marketing channels, and instead advantageously place companies directly in touch with the consumer at the point-of-sale to instruct, advise, inform or take orders. The method and apparatus of the present invention enable a marketing person at a consumer goods company to create a marketing proposal on a computer, instantly transmit the marketing proposal to consumers in thousands of stores, and quickly measure the response to the marketing proposal. This process advantageously streamlines the in-store marketing process, and at the same time, advantageously reduces marketing costs by assisting sales floor personnel.

More particularly, the method and system streamlines in-store marketing by eliminating the need for an intermediary, such as an in-store marketing company. Marketing messages are delivered instantly to the store by the manufacturer or retailer, and the results can be measured immediately by measuring the consumer's response to the marketing offer and to actual sales recorded on the store's electronic checkout system.

The combination of technologies represented by the method and system of the preferred embodiment and the Internet establishes a direct link between the manufacturer's marketing representatives and the consumer at the point-of-sale. Advantageously, this direct link is a two-way link. The consumer essentially responds to the marketing message when the consumer touches the screen of a display monitor and, for the first time, marketing communications can be measured in more ways than just final sales. The method and system can measure the consumer's response to the marketing message point-by-point, and allow the marketing person to make changes at any time that can positively affect the final success of the promotion.

This same-day change capability advantageously allows manufacturers and retailers to adjust to competition, and advantageously provides an option to change the marketing offer in mid-cycle. In contrast, prior-art in-store marketing is not easily modifiable after the time of launch, and the marketing manager must wait days or weeks for the results to modify the offer.

In accordance with a preferred embodiment of the present invention, the marketing message distribution process is reduced to one step. The manufacturer creates the marketing offer, and instantly sends the marketing offer to the stores where it is displayed on a video screen for the consumer to view, or in the absence of a video screen, a printer may print the message for the consumer to view. The marketing offer could include text, graphics, audio, animation, and other types of information.

The method and system of the preferred embodiment redefine in-store marketing communications and sales with the consumer by providing electronic generation, delivery, and fulfillment measurement of marketing offers from companies to consumers. The key benefit to retailers and manufacturers is a drastic reduction in the time it takes to deliver a marketing offer to the consumer on the sales floor and measure the results. This direct-to-consumer concept advantageously reduces third-party costs, advantageously reduces economies-of-scale levels, advantageously reduces the cost of instructing, advising, and informing consumers or taking orders, and advantageously allows companies to quickly respond to competition and changing market conditions. The in-store marketing capabilities provided in accordance with the method and system can include the ability to provide in-store printing, order processing, and full motion video on-demand. An in-store network with full-motion video capability can appeal to consumers and create interest from retailers and manufacturers seeking to differentiate their in-store presentation from conventional in-store marketing.

Thus, a method and apparatus for rapidly providing in-store marketing information and receiving consumer feedback has been described which overcomes specific problems, and accomplishes certain advantages relative to prior art methods and mechanisms. The foregoing descriptions of the specific embodiments will so fully reveal the general nature of the invention that others can, by applying current knowledge, readily modify and/or adapt the embodiments for various applications without departing from the generic concept. Therefore, such adaptations and modifications should, and are intended to be comprehended within the meaning and range of equivalents of the disclosed embodiments.

In particular, while a preferred embodiment has been described in terms of using the Internet to distribute the marketing information, those of skill in the art will understand, based on the description herein, that the method and apparatus of the present invention also would be applicable using virtually any other type of network, such as a LAN or WAN, for example. In addition, while a preferred embodiment has been described in terms of distributing marketing information and receiving consumer feedback, those of skill in the art will understand, based on the description herein, that the method and apparatus of the present invention also would be applicable to distribution of other types of information, and receipt of feedback from individuals other than consumers.

Moreover, those skilled in the art will appreciate that the flowchart presented herein is intended to teach the present invention, and that different techniques for implementing program flow that do not necessarily lend themselves to flowcharting may be devised. For example, each task discussed herein may be interrupted to permit program flow to perform background or other tasks. In addition, the specific order of tasks may be changed, and the specific techniques used to implement the tasks may differ from system to system.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

What is claimed is:

1. A method for distributing marketing information concerning at least one of a product and service of a producer to multiple retail destinations where said at least one of a product and service is sold, the method comprising the steps of:
   a) placing destination server in the multiple retail destinations, wherein each of the destination servers is controlably connected to at least one public interleave display terminal for conveying marketing messages to consumers and receiving input from consumers, and wherein each of the destination servers is integrated into a point of sale (POS) system of the retail destination in which the destination server is located;
   b) creating a marketing message on a developer system concerning the at least one of a product and service;
   c) interacting with a distribution server to identify one or more target public interactive display terminals of the at least one public interactive display terminal to which the marketing message should be distributed;
   d) distributing the marketing message to at least one target destination server, wherein the at least one target destination server is one of one or more destination servers controllably connected to the one or more target public interactive display terminals;
   e) transmitting, by the at least one target destination server, the marketing message to the one or more target public interactive display terminals;
   f) receiving, by the one or more target public interactive display terminals, feedback information concerning consumers perceiving the marketing message;
   g) receiving, by the at least one target destination server, POS system information concerning the at least one of a product and service;
   h) receiving, by the at least one target destination server, the feedback information of step (f) from the one or more target public interactive display terminals; and
   i) compiling, by the at least one target destination server, tile POS system information of step (g) with the feedback information of step (f).

2. The method as claimed in claim 1, wherein step (b) comprises the step of creating multiple layers of information within the marketing message.

3. The method as claimed in claim 1, wherein step (b) comprises the step of creating the marketing message to include text and one or more types of information from a set of types of information that includes static graphics, dynamic graphics, hyperlinks to other information, and audio information.

4. The method as claimed in claim 1, wherein step (c) comprises the steps of:
   c1) receiving, from the distribution server, a list of available public interactive display terminals to which the marketing message could be sent; and
   c2) selecting the one or more target public interactive display terminals from the list of available public interactive display terminals.

5. The method as claimed in claim 1, wherein step (d), step (h), and step (i) are performed over a network.

6. The method as claimed in claim 5, wherein the network is the Internet.

7. The method as claimed in claim 1, wherein step (c) further comprises the step of:
   c1) interacting with the distribution server to determine one or more time slots during which the marketing message should be displayed; and
   wherein the step of distributing the message to the one or more destinations comprises the step of distributing the marketing message before or during the one or more time slots.

8. The method as claimed in claim 1, further comprising the steps of:
   j) determining whether the feedback information is a request for additional information concerning the at least one of a product and service; and
   k) if the feedback information is a request for additional information concerning the at least one of a product and service, sending the additional information concerning the at least one of a product and service to the one or more target interactive display terminals.

9. The method as claimed in claim 1, wherein the at least one public interactive display terminal to which each destination server is controllably connected is placed in a specific location within the retail destination in which the destination server is located, and step (c) comprises the step of:
   interacting with the distribution server to dee one or more specific locations within at least one of the retail destinations, wherein the marketing message will be distributed to the determined one or more specific locations.

10. The method as claimed in claim 1, wherein the feedback information comprises direct communication to the producer, wherein the producer may respond in real-time to the direct communication.

11. The method as claimed in claim 1, wherein at least one of the public interactive display terminals comprises:
   a touch-screen monitor with a plurality of sections displayed therein, wherein the plurality of sections comprises:
   a touch-sensitive section which is used by consumers for requesting and inputting information.

12. The method as claimed in claim 11, wherein said plurality of sections displayed in said touch-screen monitor comprises at least one of:
   a section for displaying general information which may be unrelated to the marketing information;
   a section that enables consumers to access additional information content related to the marketing message; and a section that enables consumers to access services offered by the retail destination in which the at least one public interactive display terminal is located.

13. The method as claimed in claim 1, further comprising the step of:

transmitting the compiled information of step (i) to at least one of the distribution server and the developer system.

14. The method as claimed in claim 1, wherein the POS system information in step (g) comprises actual sales of the at least one of a product and service.

15. A system for distributing marketing information concerning at least one of a product and service of a producer to multiple retail destinations where said at least one of a product and service is sold, the system comprising:

a plurality of destination servers, each of said plural destination servers being placed in one of the multiple retail destinations, wherein each one of said plural destination servers is integrated into a point of sale (POS) system of the retail destination in which the destination server is located, wherein each one of said plural destination servers is for:

receiving and transmitting a marketing message concerning the at least one of a product and service, receiving feedback information concerning consumers perceiving the marketing message in the retail destination in which the destination server is located, receiving POS system information concerning the at least one of a product and service from the POS system of the retail destination in which the destination server is located, compiling the received POS system information along with the received feedback information, and transmitting the compiled POS system information and feedback information;

a plural of public interactive display terminals, wherein each one of said plural public interactive display terminals is controllably connected to one of said plural destination servers and is placed in the retail des on in which the destination server to which it is controllably connected is located, wherein said at least one of said plural public interactive display terminals is for;

receiving the marketing message from the destination server to which it is controllably connected, displaying the marketing message, receiving feedback information from the consumers, and transmitting the received feedback information to the destination server, a developer system for creating and transmitting the marketing message; and a distribution server which maintains records concerning each one of said plural destination servers, wherein each record comprises data concerning the retail destination in which said each destination server is located, and data concerning each one of said plural public interactive display terminals to which said each destination server is controllably connected, wherein said distribution server is for:

receiving the marketing message from the developer system, identifying one or more target public interactive display terminals to which the marketing message should be distributed, and distributing the marketing message to destination servers controllably connected to the one or more target public interactive display terminals.

16. The system as claimed in claim 15, wherein at least one of the at least one public interactive display terminals comprises a touch-screen for displaying the marketing message in graphical form, and receiving the consumer inputs via touch-sensitive sections of the touch-screen.

17. The system as claimed in claim 15, wherein at least one of the at least one public interactive display terminal comprises one or more devices from a set of devices comprising a touch-screen, a keyboard, a mouse, a trackball, a microphone, a speaker, a printer, and a magnetic card reader.

18. The system as claimed in claim 15, wherein the data concerning the at least one of said plural public interactive display terminals to which said each destination server is controllably connected comprises the location of the at least one of said public interactive display terminals within the retail destination in which it is located.

19. The system as claimed in claim 15, wherein the POS system information compiled by the destination servers comprises actual sales of the at least one of a product and service.

* * * * *

UNITED STATES PATENT AND TRADEMARK OFFICE
CERTIFICATE OF CORRECTION

PATENT NO. : 6,529,940 B1
DATED : March 4, 2003
INVENTOR(S) : David R. Humble

It is certified that error appears in the above-identified patent and that said Letters Patent is hereby corrected as shown below:

Column 13,
Line 30, delete "server" and insert -- servers --.
Line 33, delete "controlably" and insert -- controllably --.
Line 33, delete "interleave" and insert -- interactive --.
Line 63, delete "tile" and insert -- the --.

Column 14,
Line 44, delete "dee" and insert -- determine --.

Column 15,
Line 36, delete "plural" and inert -- plurality --.
Line 39, delete "des" and insert -- destination --.
Line 42, delete ";" and insert -- : --.

Signed and Sealed this

First Day of June, 2004

JON W. DUDAS
*Acting Director of the United States Patent and Trademark Office*